(12) United States Patent
Kante et al.

(10) Patent No.: US 10,942,376 B2
(45) Date of Patent: Mar. 9, 2021

(54) SYSTEM AND METHOD FOR USING EXCEPTIONAL POINTS IN PLASMONIC NANOSTRUCTURES FOR SENSING, COMMUNICATION AND IMAGING

(71) Applicant: The Regents of the University of California, Oakland, CA (US)

(72) Inventors: Boubacar Kante, La Jolla, CA (US); Ashok Kodigala, La Jolla, CA (US); Thomas Lepetit, La Jolla, CA (US); Junhee Park, La Jolla, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 196 days.

(21) Appl. No.: 16/331,177

(22) PCT Filed: Sep. 7, 2017

(86) PCT No.: PCT/US2017/050515
§ 371 (c)(1),
(2) Date: Mar. 7, 2019

(87) PCT Pub. No.: WO2018/049052
PCT Pub. Date: Mar. 15, 2018

(65) Prior Publication Data
US 2019/0219845 A1    Jul. 18, 2019

Related U.S. Application Data

(60) Provisional application No. 62/384,379, filed on Sep. 7, 2016.

(51) Int. Cl.
| | |
|---|---|
| *G02F 1/01* | (2006.01) |
| *G01N 21/552* | (2014.01) |
| *G02B 6/122* | (2006.01) |
| *G01N 21/65* | (2006.01) |

(52) U.S. Cl.
CPC ............. *G02F 1/01* (2013.01); *G01N 21/554* (2013.01); *G02B 6/1226* (2013.01); *G01N 21/658* (2013.01); *G02F 2202/36* (2013.01); *G02F 2203/10* (2013.01)

(58) Field of Classification Search
CPC ............... G02B 6/1226; G02F 2202/36; G02F 2203/10; G01N 21/554; G01N 21/658
USPC ......................................................... 359/240
See application file for complete search history.

(56) References Cited

U.S. PATENT DOCUMENTS

| | | |
|---|---|---|
| 8,189,980 B2 | 5/2012 | Miyazaki |
| 2010/0017007 A1 | 1/2010 | Seibold |
| 2013/0133711 A1 | 5/2013 | Sheldon et al. |
| 2014/0095100 A1 | 4/2014 | Raphael |

*Primary Examiner* — Mahidere S Sahle
(74) *Attorney, Agent, or Firm* — Stuart H. Mayer; Mayer & Williams PC

(57) ABSTRACT

Systems and methods according to present principles provide ways to construct and use tunable exceptional point (EP) singularities in three-dimensional plasmonic nanostructures. Such structures have applications in sensing, communication, imaging, and other fields where, e.g., determining sub wavelength features of interest is of value.

21 Claims, 12 Drawing Sheets

SYSTEM AND METHOD FOR USING EXCEPTIONAL POINTS IN PLASMONIC NANOSTRUCTURES FOR SENSING, COMMUNICATION AND IMAGING

CROSS-REFERENCE TO RELATED APPLICATIONS

This application is a national stage application, filed under 35 U.S.C. § 371, of International Patent Application No. PCT/US2017/050515 filed on Sep. 7, 2017, entitled, "SYSTEM AND METHOD FOR USING EXCEPTIONAL POINTS IN PLASMONIC NANOSTRUCTURES FOR SENSING, COMMUNICATION AND IMAGING", which claims benefit and priority of U.S. Provisional Patent Application Ser. No. 62/384,379, entitled "SYSTEM AND METHOD FOR USING EXCEPTIONAL POINTS IN PLASMONIC NANOSTRUCTURES FOR SENSING, COMMUNICATION AND IMAGING", filed Sep. 7, 2016, owned by the assignee of the present application and herein incorporated by reference in its entirety.

FIELD

The invention relates to nanostructures for various applications including sensing, communication, and imaging.

BACKGROUND

Most physical systems are open in nature, i.e. energy flows in and out and is exchanged with the environment as radiation and absorption, which is in contrast with closed systems where energy stays put and is conserved. Closed systems benefit from the well-established theory for conservative systems, i.e. Hermitian systems. A remarkable difference is that in Hermitian systems, eigenmodes do not decay and their corresponding eigenvalues are real whereas in non-Hermitian systems eigenmodes do decay and consequently their corresponding eigenvalues are complex. Over the last decade many have sought to bridge the gap between physics of open and closed systems starting with the proposal of parity-time (PT) symmetric quantum mechanics put forth by Bender et al. in 1998. This renewed attention has underlined one of the fundamental differences between Hermitian and non-Hermitian systems: their singularities. In Hermitian systems, modes couple to induce singularities called diabolical points (DPs), where only the respective eigenvalues are equal, whereas for non-Hermitian systems, modes couple to induce singularities called exceptional points (EPs), where both eigenvalues and eigenvectors coalesce.

In conjunction with theoretical inquiries, recent experimental work has given a glimpse of the many promises that an increased understanding of open systems holds. For instance, there has been ample effort in realizing novel photonic devices in the realm of lasers such as: PT-symmetric lasers [lasers operating near EPs], and Bound State in Continuum lasers. Concurrently, there has also been theoretical progress with strictly passive devices exploiting EPs for a superior sensing scheme that offers enhanced sensitivity. Thus far, EPs have been experimentally studied in a variety of physical systems including 2D microwave cavities, electronic circuits, 2D chaotic optical microcavities, and coupled atom-cavity systems.

Exceptional Points (EP's) are degeneracies in open wave systems where at least two energy levels and their corresponding eigenstates coalesce. EP's are known, however, current usage is limited to atom-cavity, 2D microwave, electronic systems.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Systems and methods according to present principles provide ways to construct and use tunable exceptional point (EP) singularities in three-dimensional plasmonic nanostructures. Such structures have applications in sensing, communication, imaging, and other fields where, e.g., determining sub wavelength features of interest is of value.

The systems are composed in one implementation of coupled plasmonic nanoresonators and can be controllably driven to EPs by controlling symmetry compatible modes via their near field and far field interactions.

Advantages of the invention may include, in certain embodiments, one or more of the following. A sensor operating at the EP singularity has enhanced sensitivity over other state-of-the-art plasmonic sensors, such as those involving Raman spectroscopy. Such may have particular importance as it is often desirable to have a sensitive sub wavelength sensing system compatible with biologically relevant substances such as are used in genomics, virology, proteomics, and so on. Systems and methods may also be applied in the design of a compact, ultra-sensitive nanosensor that can be used to make portable health-monitoring devices and to detect minute quantities of toxins and explosives for security applications. Systems and methods presented here thus address one of the major challenges of nanosensor design: how to increase sensitivity while reducing size. The nanosensor design described here combines three-dimensional plasmonic nanoparticles with singularities called exceptional points—a combination that's being demonstrated for the first time. The new physics implemented here could potentially outcompete the plasmonic technologies currently in use for sensing.

In one aspect, the invention is directed towards a method of operating an electronic device, comprising: a. providing a nanostructure; b. driving the nanostructure to an exceptional point singularity; and c. operating the nanostructure at the exceptional point singularity to perform a function.

Implementations of the invention may include one or more of the following. The method may further include providing a plurality of nanostructures, and may include operating the plurality as coupled plasmonic resonators. The driving may include controlling symmetry compatible modes. The driving may include controlling symmetry compatible modes via near field and/or far field interactions. The modes may be hybridized modes.

The nano structure may be configured such that the modes coalesce. The modes may coalesce in terms of resonance frequency and/or linewidth. The coalescence may occur by varying a geometric parameter associated with the nano structure. The device may be operated as a sensor and the function may be a sensing function. The sensing function may sense or image biologically relevant substances. The device may be operated as part of a communications device and the function may be for communications. The device may be operated as part of an imaging device and the function may be as an imager.

In another aspect, the invention is directed towards a non-transitory computer readable medium, including instructions for causing a computing environment to perform the above method.

In another aspect, the invention is directed towards a tunable structure operable at an exceptional point, including: a. a plurality of nanostructures, the plurality configured to be driven by an electromagnetic wave; b. where the plurality of nanostructures may be structured and configured as coupled plasmonic resonators; and c. where the plurality of nanostructures may be structured and configured such that the driving electromagnetic wave controls symmetry compatible modes and drives the nano structure to an exceptional point singularity, where the modes coalesce in resonance frequency and/or linewidth.

Implementations of the invention may include one or more of the following. The plurality of nanostructures may include a respective plurality of nano bars. Each nano bar may be made of gold. The structure may further include a dielectric spacer at least partially between each of the plurality of nanostructures. The plurality may include three nanobars or two nanobars or another greater number of nanobars.

In another aspect, the invention is directed towards a sensor, including the tunable structure above.

In another aspect, the invention is directed towards an imaging device, including the tunable structure above.

Advantages will be understood from the description that follows, including the figures and claims.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

DETAILED DESCRIPTION

Figure 1A:
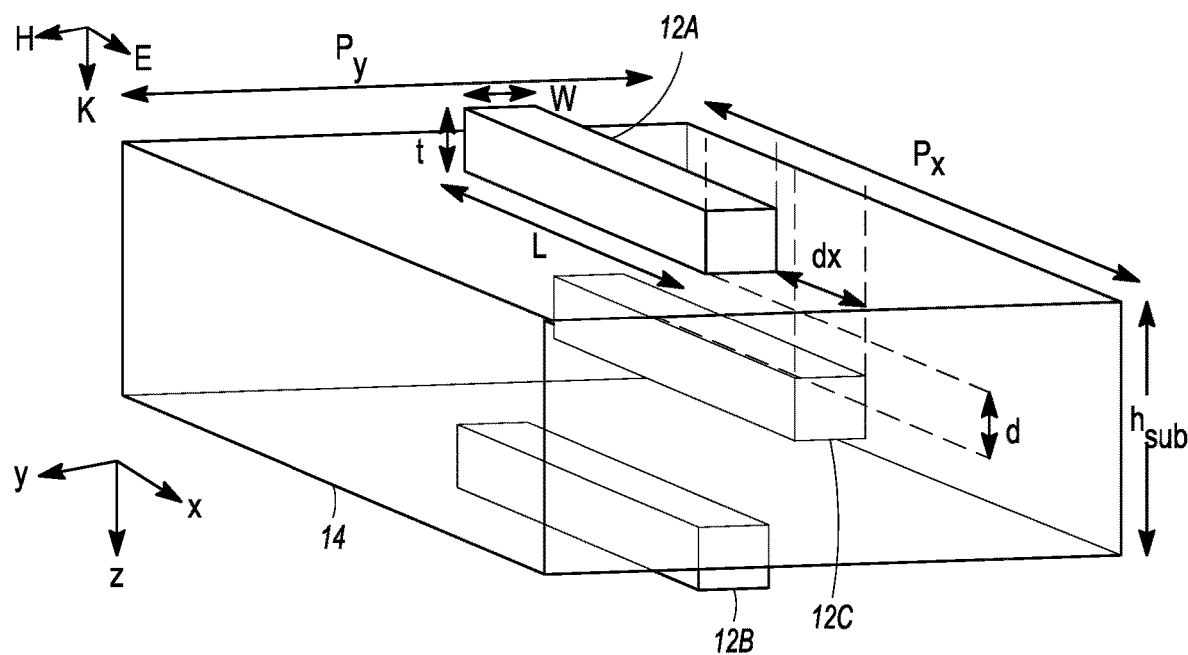
FIG. 1A shows a physical setup of a unit cell with three paired gold bars, with the middle one separated by a variable distance (dx, dy, dz) with respect to the other two.

Singularities, such as exceptional points, are fundamental in physics due to their uncanny ability to induce a large response from a small excitation. Singularities occur when a quantity is undefined or infinite, such as the density at the center of black hole, for example. Exceptional points occur when two waves become degenerate, meaning that both their resonant frequencies and spatial structure merge as one.

Exceptional points have been highly sought after for sensors and enhanced light-matter interactions. The possibility to demonstrate exceptional points in systems that are simultaneously sub-wavelength and compatible with small biological molecules for sensing has remained elusive until the development of present systems and methods.

Nanosensors operate based on a phenomenon called frequency splitting, meaning that the presence of a substance perturbs the degeneracy between two resonant frequencies and causes a detectable split. In an exceptional-point-based nanosensor, resonant frequencies would split much faster than they do in traditional nanosensors, giving rise to enhanced detection capabilities.

By combining exceptional points and plasmonics, present systems and methods provide a design for a nanosensor that is both compact and ultra-sensitive. Such a nanosensor is not just a gradual improvement of existing devices, but a conceptual breakthrough, and provides a general recipe to obtain exceptional points on demand." The method involves controlling the interaction between symmetry-compatible modes of the plasmonic system.

To date, exceptional points have not been realized in a fully three-dimensional plasmonic system. This is of importance because it is highly desirable to have a sensitive sub-wavelength sensing system compatible with biologically relevant substances. Plasmons resulting from the interaction between photons and free electrons are ideally suited for biological sensing given the field enhancement and resonance sensitivity to environment.

Described here is the first evidence of the existence of EPs in an open plasmonic system made of coupled plasmonic nanoresonators. It is shown that the control of the near-field and far-field interactions lead to a systematic construction of EPs. A general class of plasmonic architectures exhibiting designer exceptional points is subsequently described.

As noted above, systems and methods according to present principles, in one implementation, include coupled plasmonic nanoresonators which can be controllably driven to EPs by controlling symmetry compatible modes via their near field and far field interactions.

Without wishing to be bound by theory, it is believed that certain aspects of the advances and improvements set forth here stem from two points. First, it is only the three-dimensional system that can operate at an EP singularity. Second, systems and methods make use of plasmonic resonators, thereby making the system sub wavelength. Both of these aspects make systems and methods according to present principles conducive for an ultrasensitive sensing platform for biological substances.

FIG. 1A illustrates a physical setup of a unit cell with three paired gold nanobars 12a, 12b, and 12c, supporting hybridized modes, with the middle one 12c separated by a variable distance (dx, dy, dz) with respect to the other two 12a and 12b. A dielectric spacer 14 is shown, e.g., $SiO_2$. Exemplary dimensions of each nanobar may be, e.g., L (450 nm), W (50 nm), and T (40 nm), but it will be understood that these can vary.

The periodicity in x and y-directions are given by Px (800 nm) and Py (400 nm). The gold bars are described using a Drude model with a plasma frequency ($\omega p=1.367 \times 10^{16}$ rad/sec) and collision frequency ($\omega c=6.478 \times 10^{13}$ rad/sec).

Figure 1B:
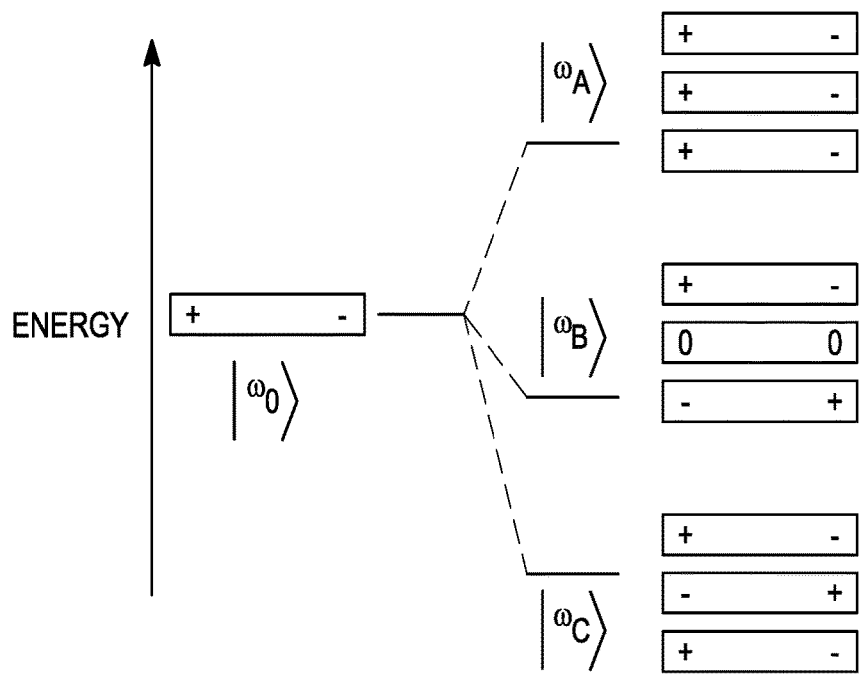
FIG. 1B shows an energy-level diagram describing the plasmon hybridization in the gold-bar system with three modes: $\omega_A$, $\omega_B$, $\omega_C$ where $\omega_A > \omega_B > \omega_C$ for dx=0. $\omega_0$ corresponds to the resonance of an individual bar.

FIG. 1B illustrates an energy level diagram describing the plasmon hybridization in the gold-bar system with three modes: $\omega_A$, $\omega_B$, $\omega_C$ where $\omega_A > \omega_B > \omega_C$ for dx=0. $\omega_0$ corresponds to the resonance of an individual bar.

As illustrated in FIG. 1A, systems and methods according to present principles employ coalescence of hybridized modes of the plasmonic system. The hybridized modes and their symmetries are portrayed on the energy scale in FIG. 1B. It is noted that this EP singularity is not limited by the number of plasmonic resonators, and EP's can be realized with higher numbers of resonators.

Figure 2A:
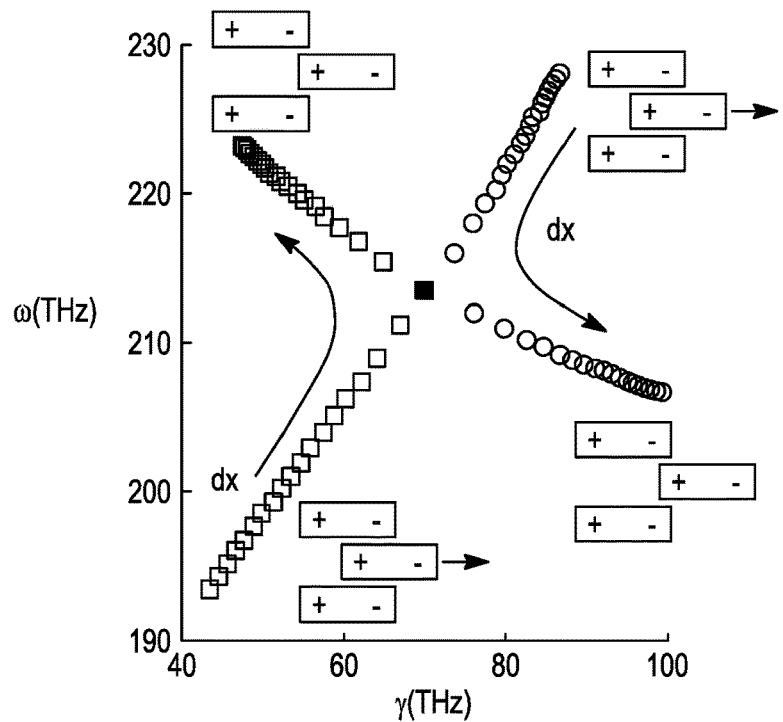
FIGS. 2A and 2B illustrate numerical simulations of resonances approaching an exceptional point.
Figure 2B:
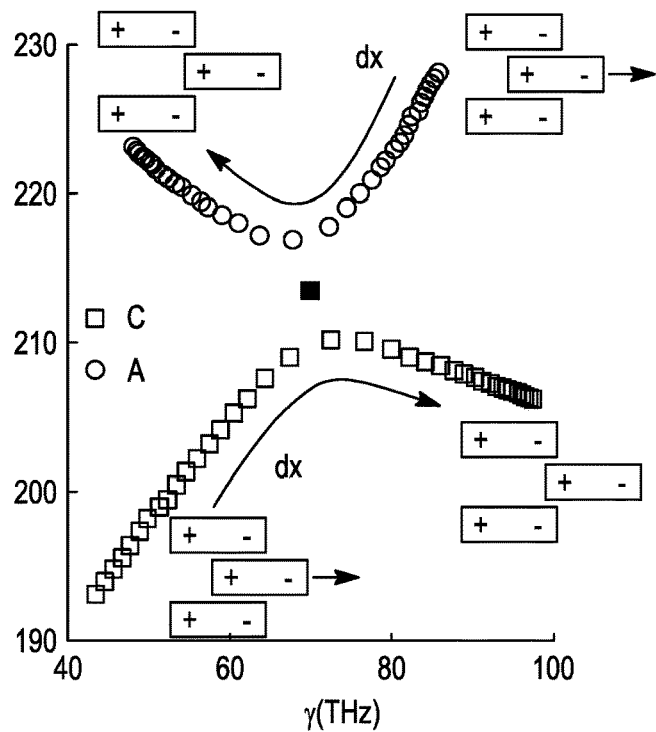

The two even modes (A and C) are forced to coalesce in terms of resonance frequency and linewidth by a variation in parameters dx and dz. This coalescence can be seen in FIGS. 2A and 2B. In these figures, resonances are shown approaching an exceptional point (black ●) and are plotted in the complex plane ($\gamma+j\omega$) for modes A (○, i.e., circles) and C (□, i.e., squares) as a function of 'dx' (300 to 400 nm) for two different values of inter-bar spacing, dz=61 and 61.5 nm (increasing 'dx' indicated by arrows). FIG. 2A shows that, for dz=61 nm, the resonance frequencies of modes A and C cross as the center bar is shifted (dx) but the linewidths are avoided; whereas (as shown in FIG. 2B) for dz=61.5 nm, the linewidths cross and the resonance frequencies are avoided. An EP singularity occurs at a value of 'dz' between 61 and 61.5 nm for a dx of ~345 nm where both resonance frequencies and linewidths coalesce.

In more detail, a plasmonic system is shown based on the three coupled nanobars, depicted in FIG. 1A. The dimensions of an individual gold nanobar are chosen such that the fundamental resonance falls in the optical domain at a frequency of 193.5 THz (1.55 μm). Placing these gold nanobars in close proximity couples their individual plasmon modes into hybrid modes.

The instantaneous charge profiles of the first three modes are depicted in FIG. 1B. Intrinsically, the system has reflection symmetry with respect to the xy-plane that bisects the central nanobar and its modes are thus either even or odd. In this case, modes A and C have an even symmetry whereas Mode B has an odd symmetry. Mode A, with eigenfrequency $\omega A$, has charges in all the bars oscillating in-phase and mode C, with eigenfrequency $\omega C$, has charges in all bars oscillating out-of-phase. Mode B, $\omega B$, has no charges in the central bar as seen in FIG. 1B. Therefore, mode A resides at a higher energy (higher frequency) due to all repelling Coulomb interactions and mode C resides at a lower energy (lower frequency) as a result of Coulomb interactions. Lastly, mode B resides between mode A and mode C on the energy scale.

The initial concept has been established by the work of the inventors and also thoroughly explored in numerical simulations (FIGS. 2A and 2B). The inventors have also fabricated these multi-layer samples according to the structure of FIG. 1A above. Scanning Electron Micrograph (SEM) images of the fabricated samples are pictured in FIGS. 3A and 3B.

Figure 3A:
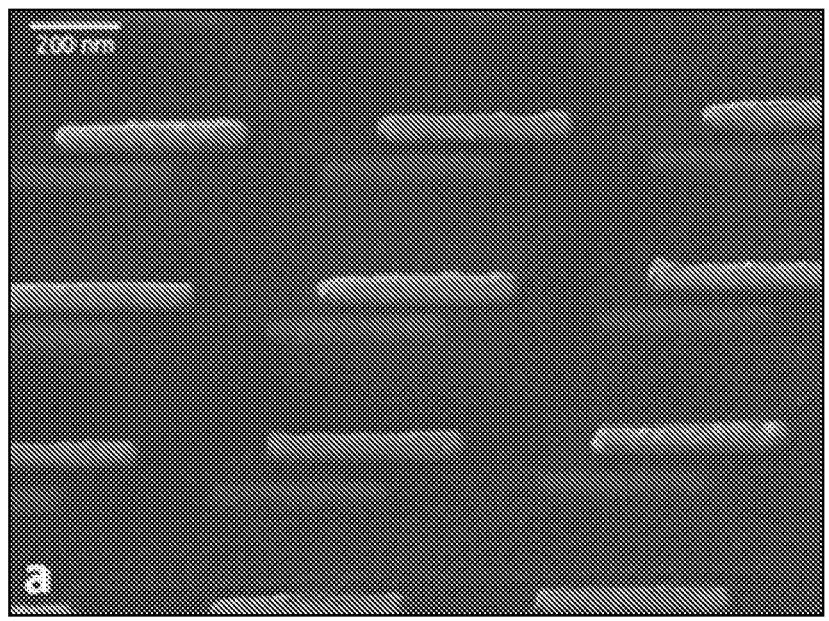
FIGS. 3A and 3B illustrate SEM images of a fabricated array of gold bars supporting hybridized modes.
Figure 3B:
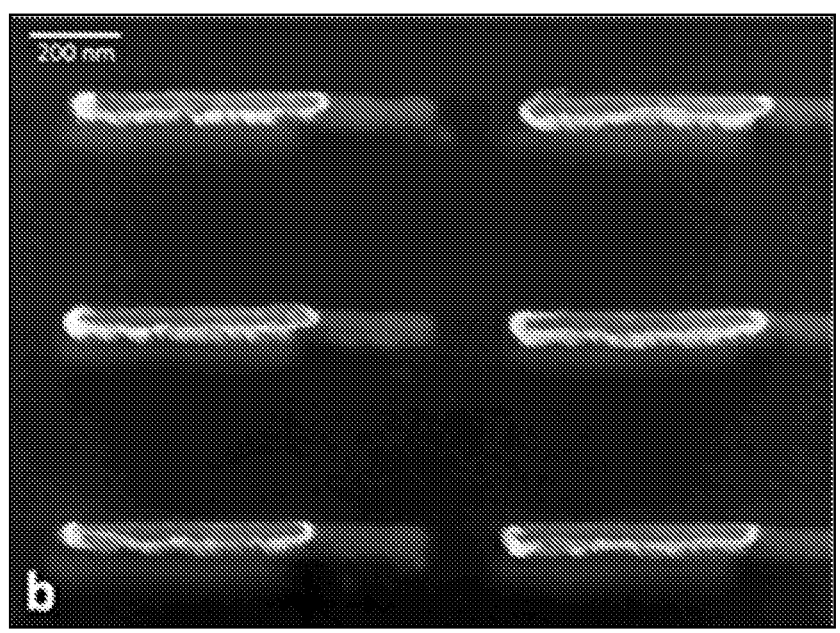

In more detail, FIGS. 3A and 3B illustrate SEM images of a fabricated array of gold bars supporting hybridized modes. FIG. 3A shows an angled-view of a two-layer system and FIG. 3B shows an angled view of a three-layer system of gold nanobars with a middle-bar shifted by some amount.

Potential Applications

Systems and methods according to present principles find manifold applications, particularly in the areas of sensing, communications, and imaging. For example, in one application, an ultrasensitive sensor can be integrated on-chip to detect biological and chemical substances on a sub-wavelength scale. The sensors could have broad medical appeal, particularly in portable diagnostics. Other applications will also be understood from this disclosure.

The formation of an EP can be understood as a specific case of mode coupling and can thus be described by Coupled-Mode-Theory (CMT). In this framework, mode coupling is described by a non-Hermitian effective Hamiltonian matrix.

$$H_{\it eff} = H_0 + j\Lambda_L + j\frac{1}{2}VV^\dagger \qquad (1)$$

Where H0 is a Hermitian Hamiltonian matrix that describes the system without coupling (closed system). The second term, $j\Lambda_L$, in the equation represents extraneous losses. In present systems and methods, this term accounts for plasmonic losses. The third term, $VV^\dagger$, describes the coupling with the environment. Hence Heff describes the full system (open system). Here, the eigenmodes of the system are represented by the complex eigenvalues and eigenvectors of the effective Hamiltonian. Experimentally, however, these eigenvalues are not directly available. Nevertheless, it is possible to measure the scattering spectra and extract eigenvalues as they directly correspond to the complex poles of the scattering spectra.

An EP is a singularity of the effective Hamiltonian, which arises due to its non-Hermitian nature, at which two modes coalesce. To achieve an EP, both the real and imaginary parts of the eigenvalues (resonance frequency and linewidth) need to coincide simultaneously. For an EP of order 2, such coalescence is dependent on at least two physical parameters. A method is thus needed to select among the geometrical parameters of the system (dx,dy,dz).

For the three-nanobar setup portrayed in FIG. 1, a closed system Hamiltonian can be used for an intuitive understanding of the mode behavior as described below.

$$H_0 = \begin{pmatrix} \omega_0 & \kappa_n & \kappa_{n2} \\ \kappa_n & \omega_0 & \kappa_n \\ \kappa_{n2} & \kappa_n & \omega_0 \end{pmatrix} \qquad (2)$$

Here, $\omega 0$ is the uncoupled resonance of an individual nanobar. $\kappa n$ and $\kappa n2$ are the nearest and next-to-nearest neighbor coupling constants acting between two individual nanobars. This matrix is bisymmetric and hence has eigenvectors that are either symmetric (even) or skew-symmetric (odd). For a 3×3 H0, there are always two even (modes A and C) and one odd (mode B) eigenvectors. For the initial three-nanobar setup (dx=0, dy=0, dz=0), $\kappa n$ is much larger than $\kappa n2$ and the Hamiltonian is almost tridiagonal. This is not favorable for coalescence, as even and odd modes are then interlaced. Hence, it is necessary to reduce $\kappa n$ with respect to κn2 to move away from a diagonally dominant Hamiltonian (1st constraint). Besides, since even and odd modes do not couple, the coalescence of the two even modes is predominately that which is interesting. Therefore, it is desired to find a parameter that does not introduce coupling between even and odd modes, i.e. does not break the system's mirror symmetry (2nd constraint). Both constraints can be met by shifting the middle bar along the x-direction.

Since plasmonic losses in these identical nanobars are represented by a scalar matrix, the losses only contribute an overall complex shift. Moreover, the coupling to the environment adds to the imaginary part of the eigenvalues.

Here, xL and xR are the left and right eigenvectors respectively. For a sufficient shift, dx and dz, mode A and mode C become degenerate (complex eigenvalue).

$$\lambda_i = \omega_i + j\gamma_L^i - j\frac{1}{2}\frac{x_L^i VV^\dagger x_R^i}{x_L^i(H_0 + j\Lambda_L)x_R^i}i \quad (3)$$
$$\in [\![a, b, c]\!]$$

The effect of shifting the middle bar in the x-direction on all three modes of the coupled plasmonic system is now numerically examined (see FIG. 4).

Figure 4A:
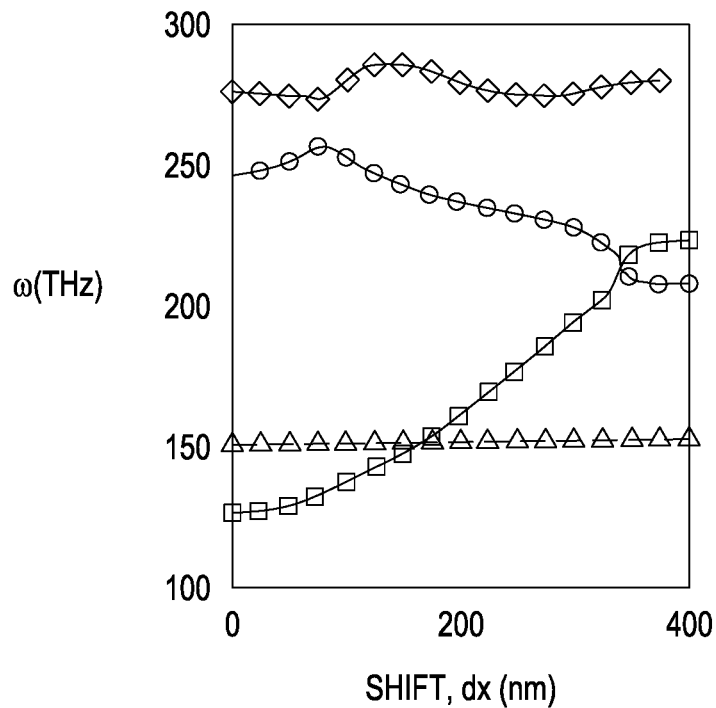
FIGS. 4A and 4B illustrates resonance information in the form of complex poles extracted from scattering parameters and plotted as a function of shift 'dx' (middle-bar) for $p_x$=800 nm and dz=60 nm.
Figure 4B:
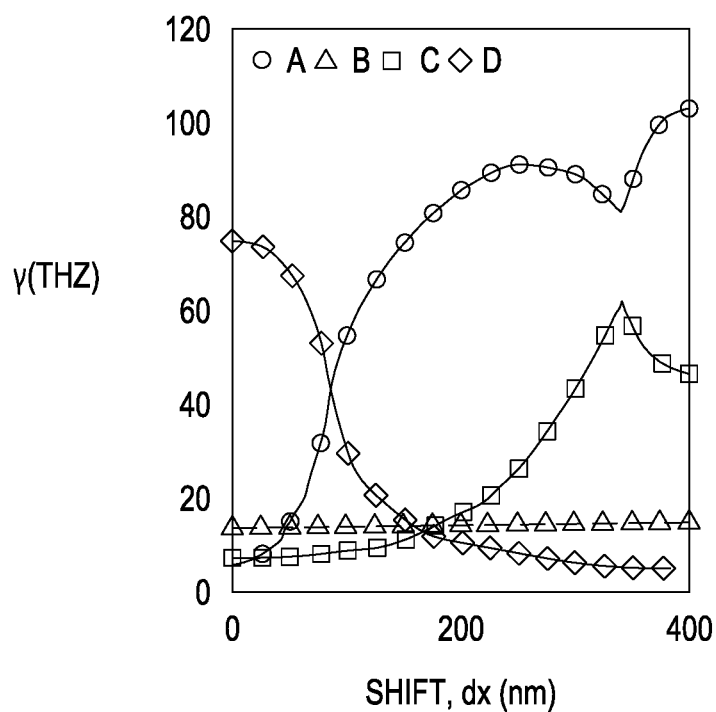

FIG. 4 shows resonance information in the form of complex poles extracted from scattering parameters and plotted as a function of shift 'dx' (middle-bar) for px=800 nm and dz=60 nm. FIG. 4A shows the resonance frequency of modes A (○), B (Δ), C (□) and higher order mode D (◇) with varying 'dx' and their corresponding (FIG. 4B) linewidths. There is observable coupling between neighboring modes that share a symmetry, i.e. mode A with C at dx=350 nm and mode A with D at dx=80 nm. Mode B is unperturbed by both the shift and neighboring modes due to its symmetry. Coupling of modes A and C is of interest for this parameter set as the resonance frequency cross with 'dx' and linewidths experience an avoided resonance crossing.

Accordingly, as the middle bar is progressively displaced, the repelling forces associated with mode A weaken to become attractive. Similarly, the attractive forces of mode C weaken to become repulsive. Lastly, the Coulomb forces associated with mode B remain constant with shift of the central bar as there is no field present in this bar. This behavior is noticeable in the resonances of this system as seen in FIG. 4A. Mode A moves to lower frequencies with shift and mode C moves to higher frequencies with shift whereas mode B remains unperturbed. Due to the presence of a higher-order resonance (mode D), also with an even symmetry, mode A does not monotonously decrease with shift. For values of 'dx' below 80 nm, mode A increases in frequency with shift due to coupling to mode D. As evident from the coupling between even modes A and D around dx=100 nm and between modes A and C at dx=340 nm, neighboring resonances of shared symmetry couple to each other. Having an odd symmetry, mode B never couples to any of the even modes. The coupling between modes is further evident in their linewidth behavior as seen in FIG. 4B. As modes A and D are avoided in frequency at dx=80 nm, their respective linewidths cross. Similarly, modes A and C cross in frequency at dx=340 nm and their linewidths exhibit an avoided resonance crossing. In terms of the near-field coupling terms, at no shift, i.e. dx=0, κn is the dominant coupling term. With an increase in dx, κn weakens with respect to κn2. It is precisely this interplay that forces the eigenvalues associated with modes A and C to converge towards one another, which is mandatory for engineering an EP. Note that the present system is not exactly at an EP.

In the close vicinity of an order-2 EP, the effective Hamiltonian of this system can be written in its reduced form as a 2×2 matrix considering only the two concerned even modes.

$$H_{\text{eff}} = \begin{bmatrix} \omega_A & 0 \\ 0 & \omega_C \end{bmatrix} + j\begin{bmatrix} \gamma_A & \sqrt{\gamma_A\gamma_C} \\ \sqrt{\gamma_A\gamma_C} & \gamma_C \end{bmatrix} \quad (4)$$

As stated earlier, realization of an EP via two modes requires at least two physical parameters. The two parameters used for the above system to reach an EP are a shift, dx, in the central bar and the inter-spacing between nanobars, dz, in the z-direction where both parameters influence κn and κn2. By performing detailed full-wave finite element simulations, presented here is a numerical proof of an EP in the nanobars system (see FIG. 5).

Figure 5A:
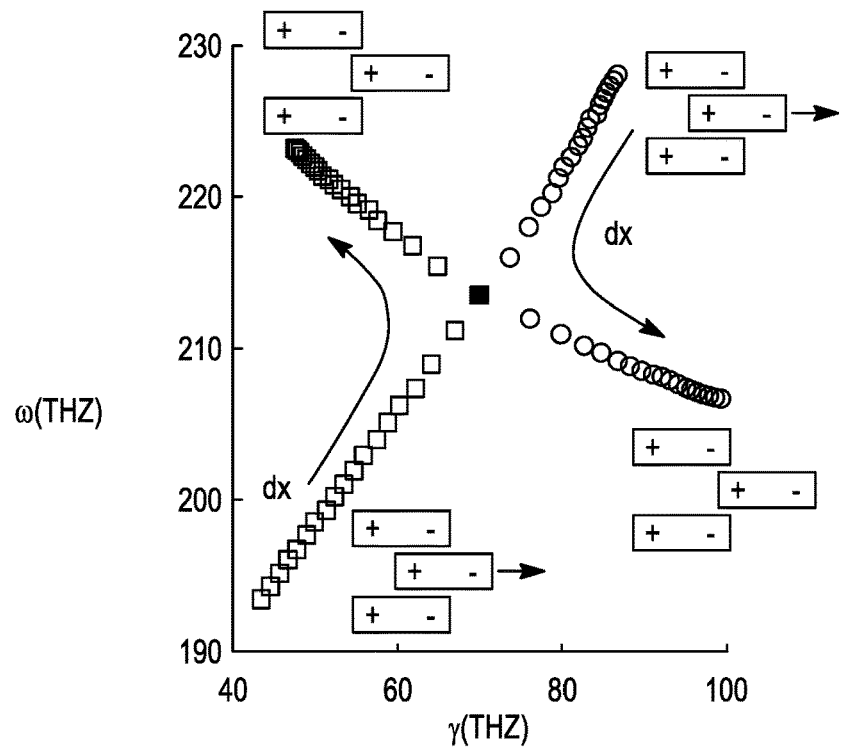
FIGS. 5A and 5B illustrate resonances approaching an exceptional point (black ■) plotted in the complex plane ($\gamma$+j$\omega$) for modes A (○) and C (□) as a function of 'dx' (300 to 400 nm) for two different values of inter-bar spacing, dz=61 and 61.5 nm (increasing 'dx' indicated by arrows).
Figure 5B:
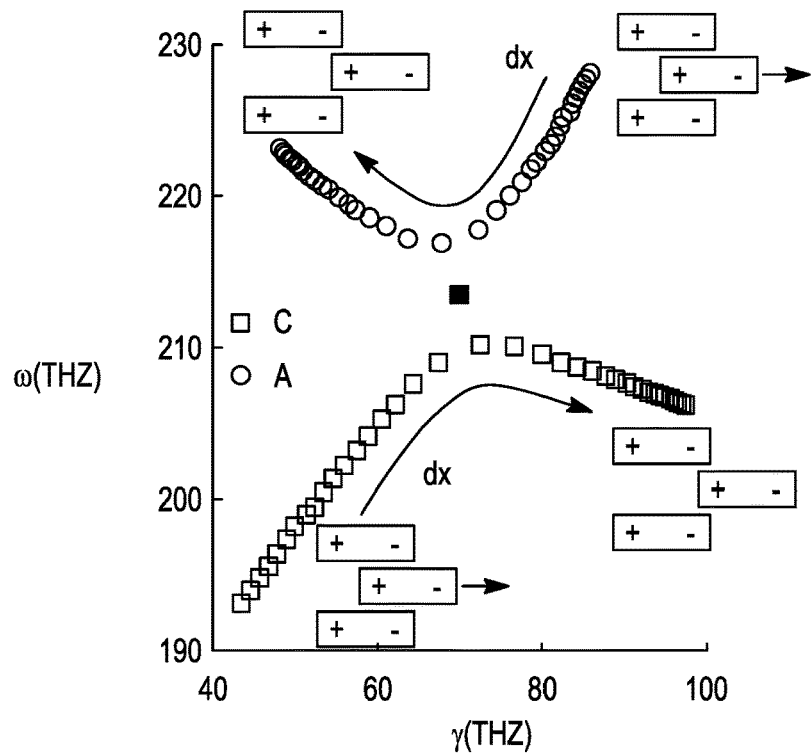

FIG. 5 illustrates resonances approaching an exceptional point (black ■) plotted in the complex plane (γ+jω) for modes A (○) and C (□) as a function of 'dx' (300 to 400 nm) for two different values of inter-bar spacing, dz=61 and 61.5 nm (increasing 'dx' indicated by arrows). FIG. 5A illustrates that for dz=61 nm, the resonance frequencies of modes A and C cross as the center bar is shifted (dx) but the linewidths are avoided whereas (FIG. 5b) for dz=61.5 nm, the linewidths cross and the resonance frequencies are avoided. An EP singularity occurs at a value of 'dz' between 61 and 61.5 nm for a dx of ~345 nm where both resonance frequencies and linewidths coalesce.

Accordingly, an EP occurs at a frequency of ~212 THz for a 345 nm lateral shift of the middle bar and an inter-particle spacing close to 61 nm. For dz=61 nm, the two resonance frequencies (ωA, ωC) cross each other with increasing shift, dx, and the linewidths (γA, γC) avoid each other as seen in FIG. 5A. Conversely, for dz=61.5 nm, the linewidths cross and frequencies are avoided as seen in FIG. 5B. For a value between 61 and 61.5 nm, there is a definite occurrence of an EP singularity where both resonance frequencies and linewidths coalesce.

Figure 6A:
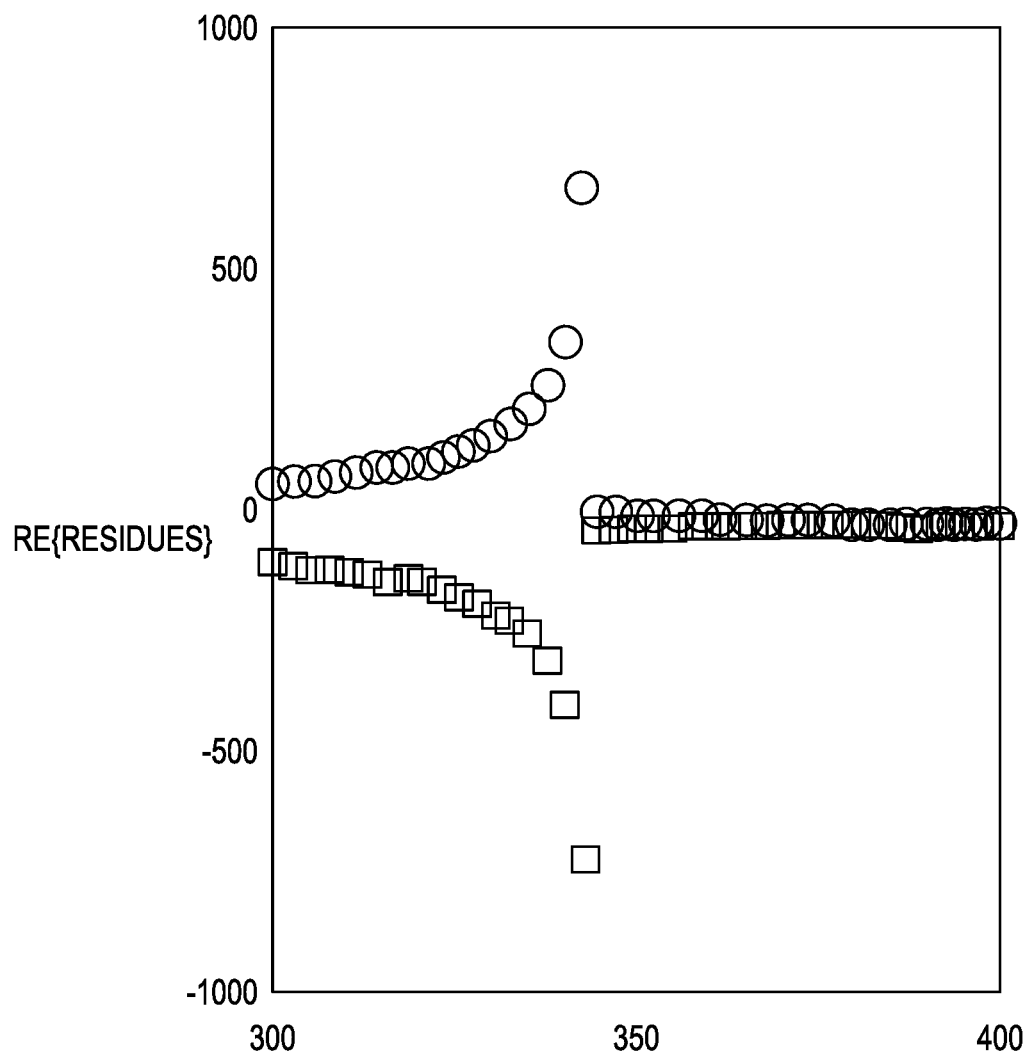
FIGS. 6A-6D shows residues of the corresponding modes A (○) and C (□) as a function of shift, dx, for dz=61 nm.
Figure 6B:
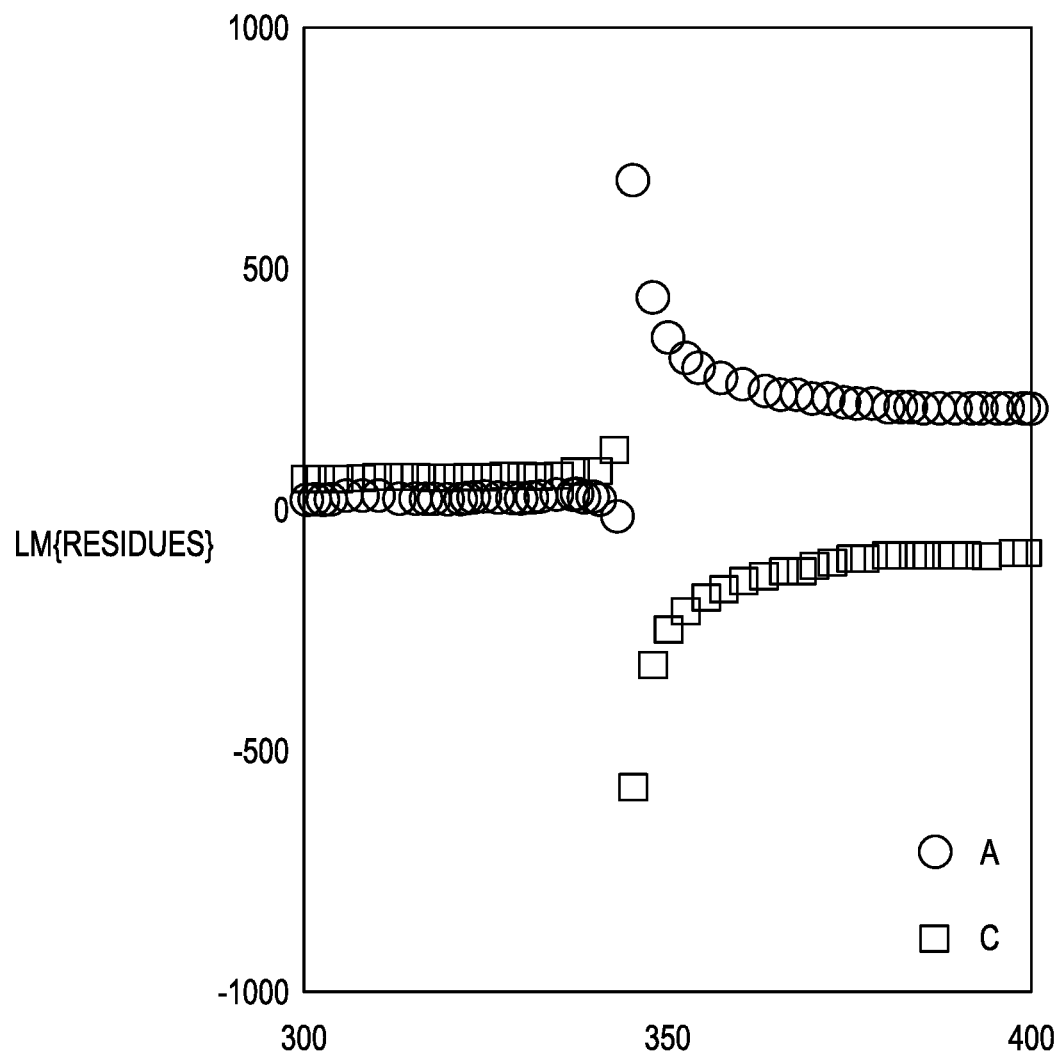
Figure 6C:
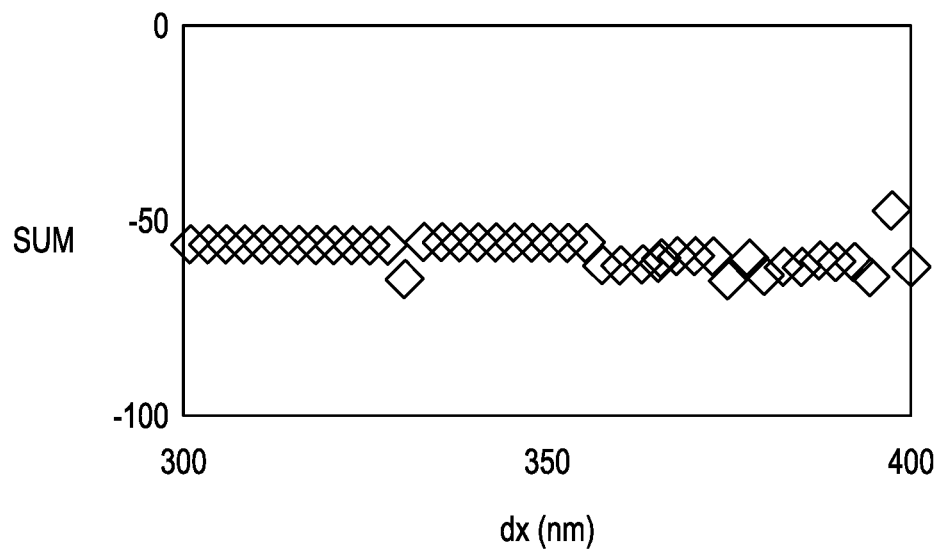
Figure 6D:
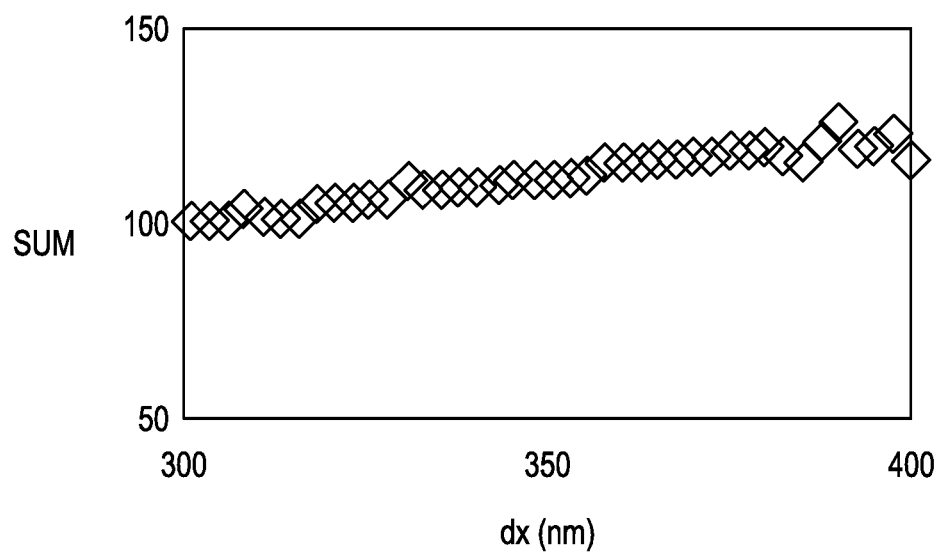

Another indication of an occurrence of an EP lies with the complex residues of the corresponding complex poles associated with the resonances. In the case of the three-nanobar system, both the real and imaginary components of the residues diverge as one approaches the EP (see FIGS. 6A, 6B).

FIG. 6 shows residues of the corresponding modes A (○) and C (□) as a function of shift, dx, for dz=61 nm. FIG. 6A shows the Real and FIG. 6B shows the Imaginary parts of the residues diverging as the system approaches the EP (dx=345 nm). Sums are also shown of the (FIG. 6C) real and (FIG. 6D) imaginary parts of the residues which remain finite.

As the EP is approached from the left, or increasing dx, the real parts diverge and similarly the imaginary parts diverge as the EP is approached from the right. However, the sum of the residues for both the real and imaginary remain finite (see FIGS. 6C 6D).

Furthermore, an EP is not exclusive to the three-bar system. An EP can also be realized in systems with more plasmonic resonators in a given unit cell. Addressed here is the general case of having an odd number of bars (N=2n+1) in a unit cell and once again guided by an N×N closed system Hamiltonian. In general, for such a matrix of order N, there are $\lfloor N/2 \rfloor$ even and $\lceil N/2 \rceil$ odd eigenvectors. These eigenvectors are alternately even and odd with eigenvalues arranged in descending order given that the eigenvalues are distinct. The resulting eigenvectors of eigenvalues (see Eq. 3) can be expressed as $(u\alpha + Ju)^T$ (even eigenvectors)

$(u\ 0 - Ju)^T$ (odd eigenvectors)    (5)

Here, J is the exchange matrix. For an odd eigenvector, there is no excitation or field in the central bar as was the case for Mode B earlier.

As an example, below is the case with five coupled bars (n=2) described by a 5×5 Hamiltonian, H0, written as follows when all bars are perfectly aligned in the z-direction, i.e. dx=0.

$$H_0 = \begin{pmatrix} \omega_0 & \kappa_n & \kappa_{n2} & 0 & 0 \\ \kappa_n & \omega_0 & \kappa_n & \kappa_{n2} & 0 \\ \kappa_{n2} & \kappa_n & \omega_0 & \kappa_n & \kappa_{n2} \\ 0 & \kappa_{n2} & \kappa_n & \omega_0 & \kappa_n \\ 0 & 0 & \kappa_{n2} & \kappa_n & \omega_0 \end{pmatrix} \quad (6)$$

Here, it is possible to neglect the coupling terms κn3 and κn4 as they are simply dominated by κn and κn2. Similar to the three-bar case, physical parameters must be chosen to modify so as to weaken κn and strengthen κn2. In order to retain the bisymmetric nature of the Hamiltonian, all nearest-neighbor and next-to-nearest-neighbor coupling terms need to be the same as the geometry of the system is modified in accordance with the two constraints outlined earlier. Therefore, the top, middle and the bottom bars are concurrently shifted in the x-direction which satisfies this condition and appropriately modifies κn and κn2. For an order N=5, there are three even and two odd eigenvectors. For an EP, attention is focused on interaction between two of the even modes. The two parameters are still the interspacing, dz, along the z-direction and shift, dx (see FIG. 7).

Figure 7A:
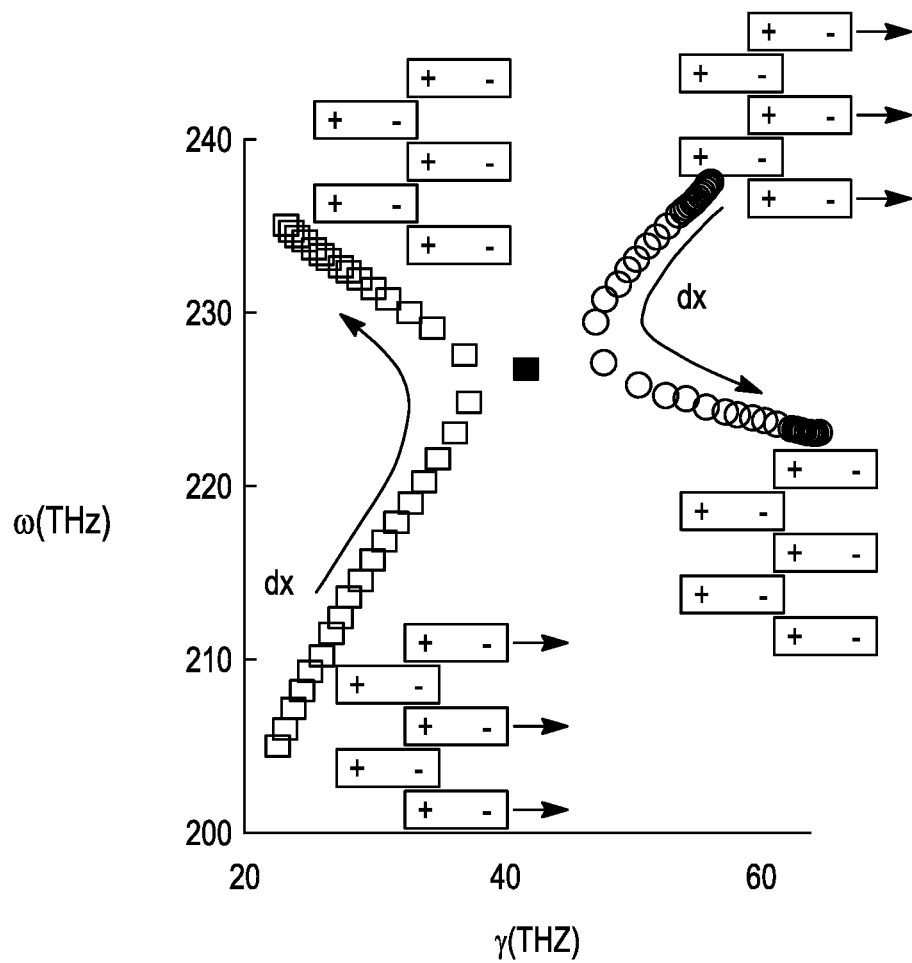
FIGS. 7A and 7B show realization of an exceptional point in a system with 5 bars (2n+1 with n=2) with top, middle and bottom bars shifted by dx (300 to 400 nm) for dz=42 nm and 43 nm.
Figure 7B:
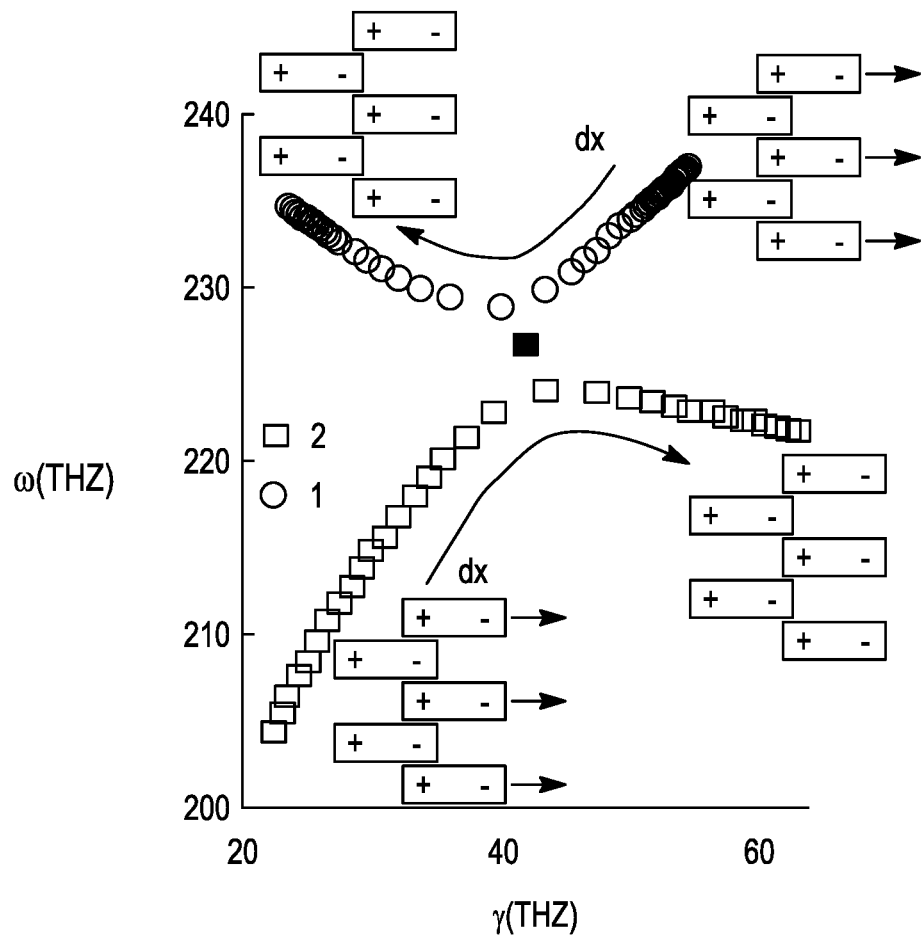

FIG. 7 shows realization of an exceptional point in a system with 5 bars (2n+1 with n=2) with top, middle and bottom bars shifted by dx (300 to 400 nm) for dz=42 nm and 43 nm. Mode 1 (○) and Mode 2 (□): two modes of shared symmetry interact to form an EP (■) at a value of d between 42 and 43 nm for a dx of ~345 nm. FIG. 7A shows that for dz=42 nm, the resonance frequencies of modes 1 and 2 cross as the center bar is shifted (dx) but the linewidths are avoided whereas FIG. 7B shows that for dz=43 nm, the linewidths cross and the resonance frequencies are avoided.

Similar to the three-bar case, resonances are observed crossing in frequency and an avoided crossing in linewidths as evidence of an EP. An EP occurs at a frequency of ~227 THz for a 345 nm lateral shift of the bars and an interparticle spacing, dz, close to 42 nm. This approach is general and can be utilized to engineer an EP in coupled nanoresonator structures which can be physically realized.

Figure 8:
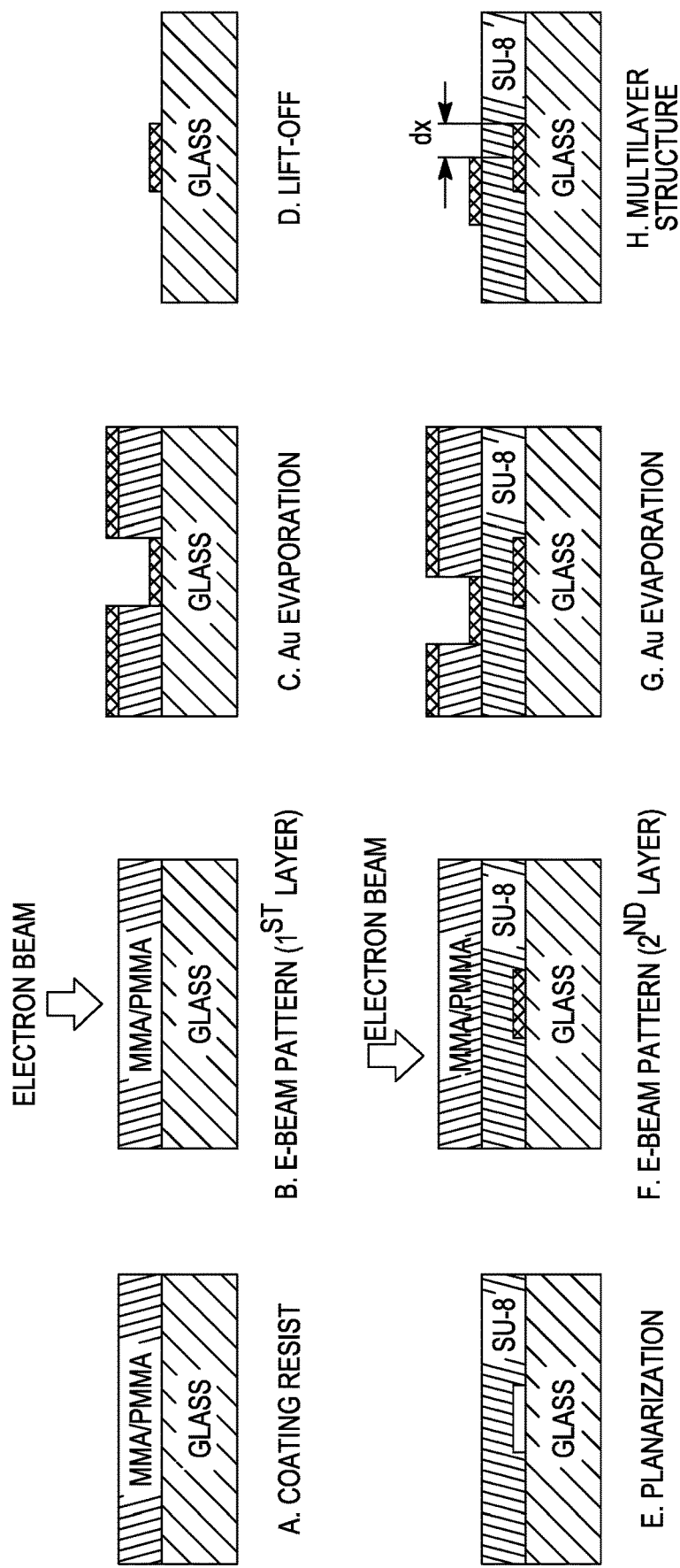
FIG. 8 shows one exemplary fabrication technique for a shift-bar system as described above.

One exemplary fabrication process for this multi-layer structure is detailed in FIG. 8. Referring to FIGS. 8A-8D, starting with a clean glass substrate, MMA and PMMA are used as the bi-layer e-beam resist for the lithography. Au/Cr (37 nm/3 nm) metals are evaporated after resist development followed by a lift-off process completing the first layer of the metasurface. FIG. 8E shows how SU-8 is spun on to the first layer acting as a dielectric spacer between layers. However, the surface of the SU-8 layer is uneven due to the existence of the first layer and is planarized by thermally cycling the sample repeatedly followed by SU-8 crosslinking via UV light exposure plus hard baking. FIG. 8F-8H shows how E-beam lithography, metallization and lift-off steps are repeated for the second layer to realize the completed multi-layer structure.

In more detail, the multilayer metamaterials are fabricated on a glass substrate using high-resolution electron-beam lithography (EBL) (Vistec EBPG5200 writer). First, the glass substrate is cleaned with acetone and isopropyl alcohol (IPA) while sonicating. To minimize sidewall roughness during the lift-off process, high-resolution positive-tone bilayer resists, methyl methacrylate (MMA-EL 8) and polymethyl methacrylate (PMMA-A2) are used for the e-beam resist. MMA resist is spun on first at a thickness of 150 nm and 50 nm of PMMA is spun subsequently [FIGS. 8A and 8B]. After the writing step and development by MIBK solvent, a 3 nm layer of chromium (adhesion layer) is deposited followed by 37 nm of gold (Au) using an electron beam evaporation system. The e-beam resist is lifted off using a photoresist remover completing the first layer [FIGS. 8C and 8D].

After the lift-off process, a 100 nm thick SU-8 photoresist is spin-coated onto the sample. Due to the existence of the first layer of metallic structures, the surface of the SU-8 layer is uneven and needs to be planarized for subsequent fabrication steps. This is done by thermally cycling the sample repeatedly followed by SU-8 crosslinking via UV light exposure and a final hard bake step. To confirm the planarization, the roughness of SU-8 layer surface was determined using atomic force microscopy (AFM) and the surface roughness (RMS) was found to be below 5 nm. Thus, the first layer of gold bars on the glass substrate are embedded in SU-8 which also serves as a dielectric spacer [FIG. 8E]. EBL, metal deposition, and lift-off steps for the second layer are carried out in a similar manner as the first layer with the requirement of gold alignment marks to ensure the precise stacking of layers [FIGS. 8F-8H]. The completed multilayer structure can be seen in FIG. 8H. More layers can be added by repeating the process.

Figure 9:
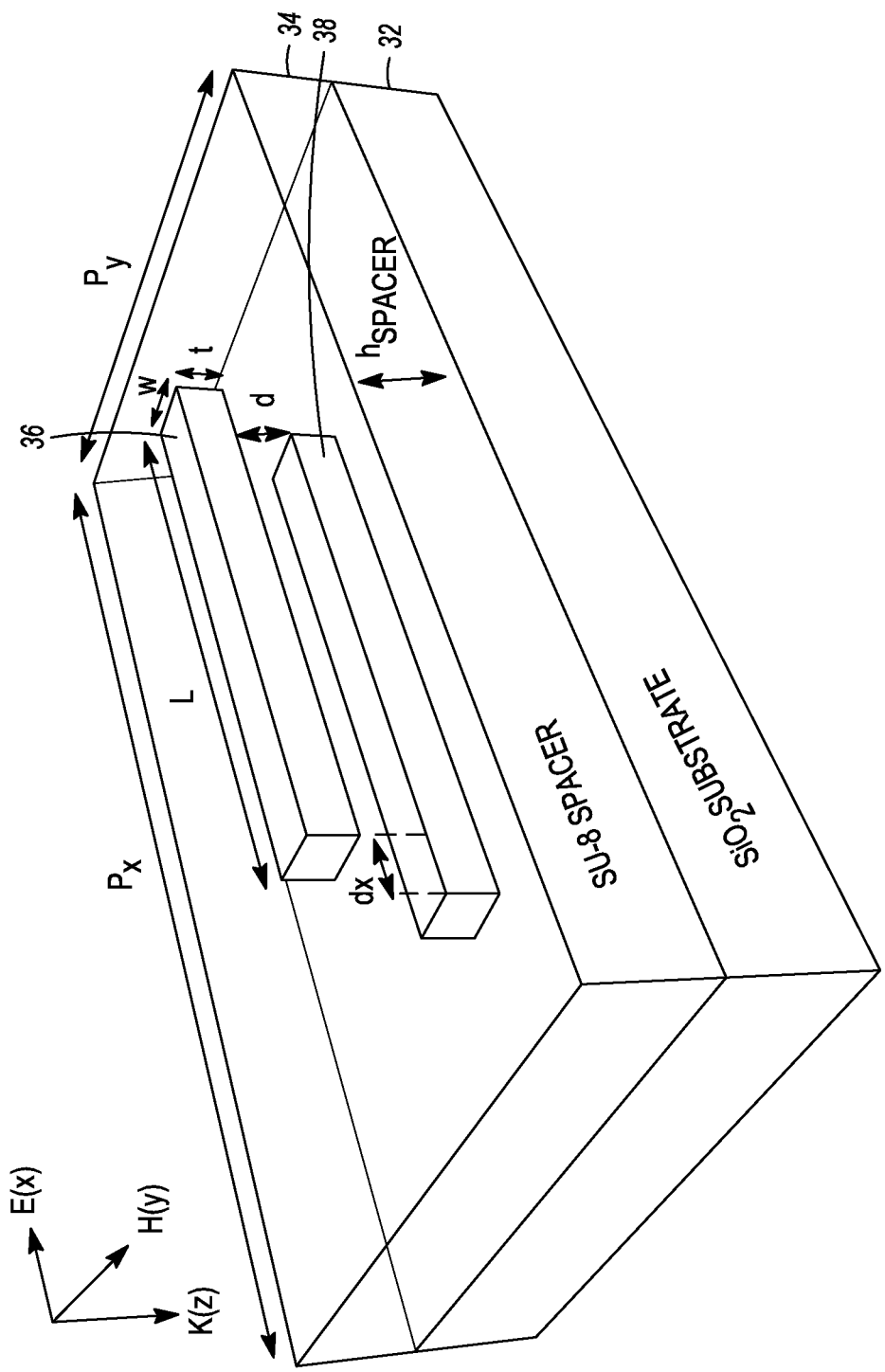
FIG. 9 shows a physical setup of a unit cell with two paired gold bars.

Referring next to FIG. 9, a system similar to that of FIG. 1 is illustrated, but in the case where the exceptional point is realized with only two bars 36 and 38. A substrate 32 is shown, along with the spacer layer 34. Px is the period of the unit cell in the x-axis, and Py is the period of the unit cell in the y-axis. L is the length of the nano rod, W is the width of the nano rod, and t is the thickness of the nano rod. d represents the distance between two bars and dx is the shift in x. Hspacer is the spacer thickness. This system, which like that of the three bar system has also been built, shows that systems and methods according to present principles can be extended to the case with just two nanostructures. Implementing exceptional points with the two bar system can generally greatly simplify fabrication. By coupling two metallic bars that are in an asymmetric environment due to the presence of the substrate or that are intentionally asymmetric by using bars of different size, an exceptional point can also be attained. Modes are not of orthogonal symmetries due to the asymmetry of the system and thus can reach an exceptional points when the coupling is controlled. The two bar system has the advantage of minimizing the number of fabrication steps and greatly simplifies the implementation of the device. The two bar system can also be manufactured using self-assembly methods. The amount of loss at the exceptional point can be controlled with the number of layers and the number of layer can thus be chosen based on the loss acceptable for given applications.

Systems and methods according to present principles have the benefit of, in many implementations, being fully passive. In addition, such systems and methods implement exceptional points in plasmonics for the first time. In this context it is noted that substances relevant to sensing are usually very small, and a very small wavelength is required to detect them. This is the case for plasmons, but is not the case in ring resonators, that are big compared to wavelength.

This invention is related to the work published in "Exceptional Points In Three-Dimensional Plasmonic Nanostructures", A. Kodigala, T. Lepetit, and B. Kante, Phys. Rev. B 94, 201103(R) (2016), and "Hybridized Meta-Material Platform For Nanoscale Sensing", J. Park, A. Kodigala, A. Ndao, and B. Kante, Optics Express 25 (13) (26 Jun. 2017), both of which are incorporated by reference herein.

The existence of exceptional points has been demonstrated in a three-dimensional system of coupled plasmonic nanostructures. The EP is constructed by coalescing symmetry-compatible modes and its existence is further evident from the diverging complex residues in the vicinity of the EP singularity. A thorough discussion on the importance of mode symmetries for EPs was presented.

The general approach to designing EPs in systems of coupled resonators proposed here can be used to construct EPs of higher order in physical systems where more than two modes coalesce. These ideas could be applied to other areas of wave physics such as acoustic and matter waves. This work paves the way to the experimental observation of exceptional points in various physical systems and will foster further research towards unprecedented sensing schemes.

The above description illustrates various exemplary implementations and embodiments of the systems and methods according to present principles. The invention is not limited to such examples. The scope of the invention is to be limited only by the claims appended hereto, and equivalents thereof.

The invention claimed is:

1. A method of operating an electronic device, comprising:
    a. providing a nanostructure;
    b. driving the nanostructure to an exceptional point singularity; and
    c. operating the nanostructure at the exceptional point singularity to perform a function.

2. The method of claim 1, further comprising providing a plurality of nanostructures, and operating the plurality as coupled plasmonic resonators.

3. The method of claim 1, wherein the driving includes controlling symmetry compatible modes.

4. The method of claim 3, wherein the driving includes controlling symmetry compatible modes via near field and/or far field interactions.

5. The method of claim 3, wherein the modes are hybridized modes.

6. The method of claim 5, wherein the nano structure is configured such that the modes coalesce.

7. The method of claim 6, wherein the modes coalesce in terms of resonance frequency and/or linewidth.

8. The method of claim 7, wherein the coalescence occurs by varying a geometric parameter associated with the nano structure.

9. The method of claim 1, wherein the device is operated as a sensor and the function is a sensing function.

10. The method of claim 9, wherein the sensing function senses or images biologically relevant substances.

11. The method of claim 1, wherein the device is operated as part of a communications device and the function is for communications.

12. The method of claim 1, wherein the device is operated as part of an imaging device and the function is as an imager.

13. A non-transitory computer readable medium, comprising instructions for causing a computing environment to perform the method of claim 1.

14. A tunable structure operable at an exceptional point, comprising:
    a. a plurality of nanostructures, the plurality configured to be driven by an electromagnetic wave;
    b. wherein the plurality of nanostructures are structured and configured as coupled plasmonic resonators; and
    c. wherein the plurality of nanostructures are structured and configured such that the driving electromagnetic wave controls symmetry compatible modes and drives the nano structure to an exceptional point singularity, wherein the modes coalesce in resonance frequency and/or linewidth.

15. The structure of claim 14, wherein the plurality of nanostructures includes a respective plurality of nano bars.

16. The structure of claim 15, wherein each nano bar is made of gold.

17. The structure of claim 14, further comprising a dielectric spacer at least partially between each of the plurality of nanostructures.

18. The structure of claim 14, wherein the plurality comprises three nanobars.

19. The structure of claim 14, wherein the plurality comprises two nanobars.

20. A sensor, comprising the tunable structure of claim 14.

21. An imaging device, comprising the tunable structure of claim 14.

* * * * *